United States Patent [19]

Ruehlemann

[11] Patent Number: 4,460,823
[45] Date of Patent: Jul. 17, 1984

[54] DUAL MODE PEDOMETER

[75] Inventor: Gerhard Ruehlemann, Uttenreuth, Fed. Rep. of Germany

[73] Assignee: K & R Precision Instruments, Inc., Orlando, Fla.

[21] Appl. No.: 451,332

[22] Filed: Dec. 20, 1982

[51] Int. Cl.³ .............................................. G01C 22/00
[52] U.S. Cl. ...................................................... 235/105
[58] Field of Search ........................................... 235/105

[56] References Cited

U.S. PATENT DOCUMENTS 3,818,194  6/1974  Biro ..................................... 235/105
4,220,996  9/1980  Searcy ............................. 235/105 X
4,322,609  3/1982  Kato ..................................... 235/105

Primary Examiner—Donald A. Griffin
Attorney, Agent, or Firm—Duckworth, Allen, Dyer & Pettis

[57] ABSTRACT

A pedometer for indicating distance traveled by a user in walking or running. A mechanical digital counter is provided and driven by a gear train from a ratchet wheel. A pivoted pendulum is maintained in an at-rest position by a first biasing spring which is suitable for use during walking. During running when more kinetic energy is developed in the pendulum, a second biasing spring may be selectively engaged with the first biasing spring to increase the tension thereof for absorbing the additional energy without damage to the apparatus. A movable stop for the pendulum is provided having an external adjustment knob to set the pendulum travel in accordance with the length of stride of the user. The user may change the length of stride and the walk/run mode without resetting of the digital distance indicator.

9 Claims, 4 Drawing Figures

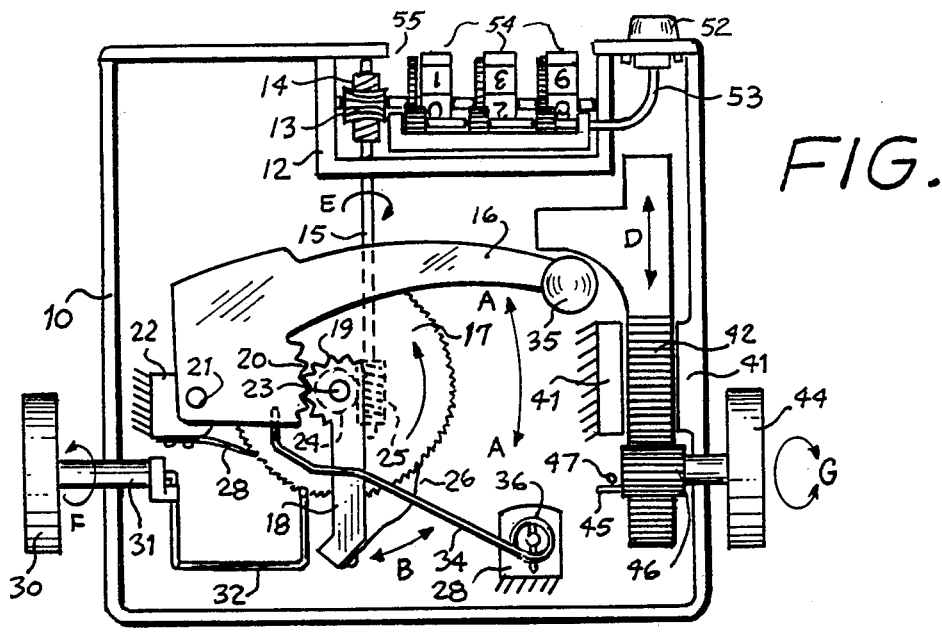
FIG. 1
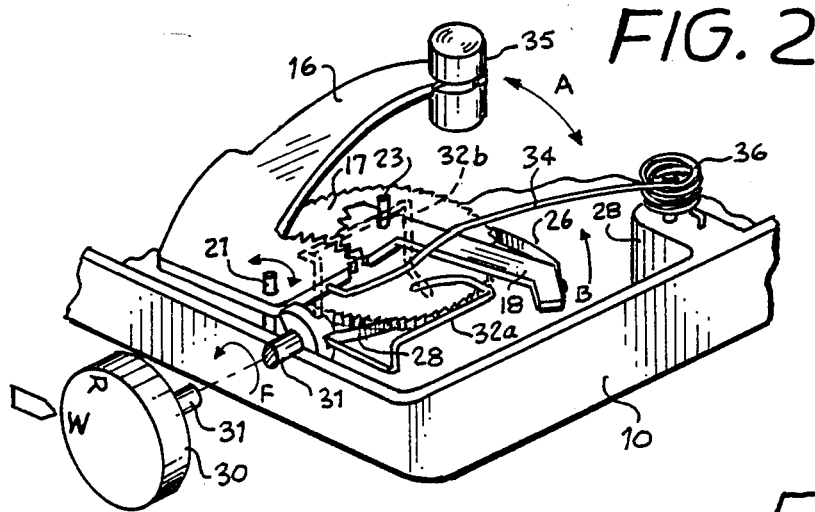
FIG. 2
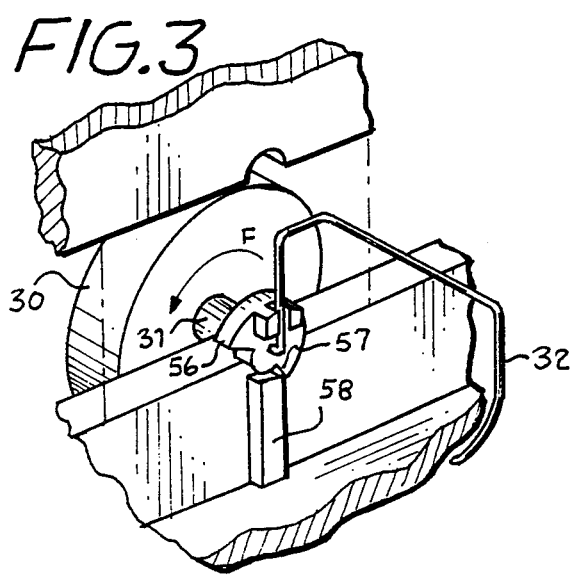
FIG. 3
FIG. 4

DUAL MODE PEDOMETER

BACKGROUND OF THE INVENTION

1. Field of the Invention

The present invention relates to a pedometer for measuring distances covered by a walker or runner, and more specifically to an instrument having a stride adjustment and a control for selecting a walking or running mode of operation.

2. Description of the Prior Art

It is known in the prior art to provide a pedometer which utilizes a swinging pendulum to advance a distance indicator. A problem that has arisen with the use of a pendulum is that the restraining and restoring force on the pendulum must absorb and dissipate the kinetic energy developed in the pendulum to prevent damage to the mechanism. Thus, it has been common to design a pedometer instrument to have a relatively light restoring force for walking and a separate instrument having a stronger restoring force for use by runners. Thus, a person who desires to alternate between walking and running requires two instruments. Most prior art pedometers show distance covered by a scale and pointer arrangement which causes difficulty in obtaining accurate readings. A digital display is preferred which has in the past greatly increased the cost of the device. For example, U.S. Pat. No. 4,220,996 to Searcy and No. 4,223,211 to Allsen, et al, teach digital displays but which require electronic circuitry for activation.

There is thus a need for a simple lightweight, low cost pedometer having a digital readout in which the operation can be switched between running and walking, in which the length of stride can be adjusted, and in which alternative modes of walking and running can be selected without resetting of the counter.

SUMMARY OF THE INVENTION

The present invention provides a lightweight, low cost pedometer which is usable for both walking and running. The invention may be housed in a small case of plastic or similar material including a belt clip for attaching to the user's clothing. A three digit mechanical type digital counter is utilized which is gear driven from a drive shaft. The drive shaft is rotated through a worm and pinion gear from a large toothed ratchet wheel. The ratchet is rotated by a pawl formed from a thin, narrow strip of spring steel coupled to a driving arm. The driving arm includes a sector gear engaged with a pendulum arm also having a sector gear. When the pendulum arm swings responsive to a step of the user, it rotates the sector gears and the pawl driving arm a predetermined amount representative of the length of stride of the user. A rack and pinion device driven by an external knob is utilized to control the length of the swing of the pendulum, thereby providing means for adjusting the pedometer to match the length of stride of a particular user. The adjustment knob may be calibrated in feet, inches or other linear measurement units. The pendulum arm is biased to its at rest position by an elongate first spring steel wire with the distal end bearing on the pendulum arm and the proximal end terminating in a coiled spring anchored to the case. The strength of the coiled spring and spring steel wire is selected such that, for the possible walking stride lengths, the pendulum will swing with a force suitable to drive the ratchet wheel.

It will be understood that a user who is running would impart much greater energy to the pendulum producing a danger of damage to the elements of the pedometer. In accordance with the invention, means is provided to increase the tension of the pendulum arm first biasing spring when the pedometer is to be used to measure the distance covered by a runner. A WALK-RUN selector knob is provided external to the pedometer case and having a shaft extending through the case. The inner end of the selector knob shaft has a generally U-shaped spring steel wire attached thereto such that one leg of the U is at right angles to the shaft and attached at the open end of the U to form a second biasing spring. The selector knob is contrained by stops to permit 90° rotation thereof. In one extreme position, the U-shaped spring steel wire is held completely clear of the pendulum arm first biasing spring wire. In the other extreme position of the selector knob, the open side wire of the U opposite the attached portion contacts the biasing spring near the point at which it contacts the lever arm. Detents may be provided to maintain the selector knob in either of the extreme positions.

With the knob in the position for running, the U-shaped wire contacts the biasing spring wire as described above such that the pendulum experiences a significantly higher restoring force as it swings in response to the body motion of a runner. Thus, the pendulum is partially damped and the extra energy imparted thereto is expended in the resistance of the U-shaped spring wire. As may now be understood, the auxiliary spring prevents damage such as might occur when running with only the first biasing spring due to the higher kinetic energy transferred to the pendulum arm in such instance.

The digital counter includes a reset button which permits resetting the counter to zero prior to use. Since the counter is independent of the actuating mechanism, the user can switch between run and walk, and can change the stride length without resetting the counter.

It is therefore a principal object of the invention to provide a small, lightweight and low cost pedometer that may be used for walking or running without danger of damage to the device when running.

It is another object of the invention to provide a dual purpose pedometer having selector means for setting the device to measure distance walked or distance ran.

It is still another object of the invention to provide a pedometer having a pendulum arm with selectable biasing tension thereon for providing a greater bias for running than for walking.

It is yet another object of the invention to provide a pedometer having a mechanical counter type readout which will read in miles and tenths or in other linear measurement units.

It is a further object of my invention to provide a pedometer in which the length of throw of the pendulum is adjustable in accordance with the stride of the user.

It is yet a further object of my invention to provide a pedometer in which the length of stride and the run/walk selection may be made without resetting the counter.

These and other objects and advantages of the invention will become apparent from the following detailed description and the drawings.

BRIEF DESCRIPTION OF THE DRAWINGS

FIG. 1 is a simplified representation of the pedometer of the invention having one-half of the case thereof removed and showing the basic operation thereof;

FIG. 2 is a perspective view of the drive mechanism portion of the pedometer illustrating the mechanism for selecting a "run" or "walk" mode of operation;

FIG. 3 is a detail of the run/walk control; and

FIG. 4 is a perspective view of the pedometer of the invention installed in a case which may be clipped to the clothing of a user.

DETAILED DESCRIPTION OF THE PREFERRED EMBODIMENT

Referring to FIG. 1, a typical construction of the pedometer of the invention is illustrated partly in schematic form. A housing 10 is provided which is considered to comprise two parts with the top part assumed removed in the drawing for exposing the working elements thereof. A three digit veeder root counter 12 is attached to the case 10 having the counter wheels viewable through an opening 55 at the upper end of the case. The counter wheels are driven, as is well known in the art, through spur gear 13 and worm gear 14 rotated by shaft 15. As seen in phantom view, shaft 15 is driven by a worm gear 25. Worm gear 25 is rotated by spur gear 24 also shown in phantom view immediately below ratchet wheel 17. Shaft 23 is secured to spur gear 24 and ratchet wheel 17. Also attached to shaft 23 is pawl arm 17. As will be noted, a pawl 26 is attached to the outer end of pawl arm 18 with pawl 26 being formed from a narrow, thin strip of spring steel. Ratchet wheel 17 includes a multiplicity of very small ratchet teeth around its periphery which are engaged by pawl 26 as explained below. A fixed pawl 28 is attached to boss 22 which is integral with case 10. Fixed pawl 28 prevents any possible movement of ratchet wheel 17 in the reverse direction.

Pawl arm 18 includes a sector gear 19 pivoted on shaft 23 which is coupled to a second sector gear 20 integral with pendulum arm 16. Pendulum arm 16 is pivotally mounted to boss 22 by pin 21 and is free to rotate about pin 21 as indicated by arrows A. At the outer end of pendulum arm 16 is pendulum weight 35. As can be seen, pendulum arm 16 can swing from a point where it contacts stop 43 to the point when the inner portion 49 of arm 16 contacts pawl arm 18. Advantageously, the position of stop 43 is adjustable by knob 44 for controlling the swing of arm 16 in accordance with the stride of the user. Accordingly, a rack element 42 attached to stop 43 rides in guides 41 and couples to pinion gear 46. Gear 46 includes a stop pin 45 which will bear against stop 47 in either of its extreme positions. Rotation of knob 44 as indicated by arrows G causes rack 42 to move as shown by arrows D varying the length of swing of pendulum arm 16. As pendulum arm 16 swings in the downward direction in FIG. 1, sector gear 20 rotates sector gear 19 moving arm 18 as indicated by arrow B. This action causes pawl 26 to move ratchet wheel 17 in the direction shown by arrow C. This drives shaft 15 via spur gear 24 and worm gear 25 thereby advancing counter 12 in accordance with the stride setting of knob 44. At the end of a stride, a first pendulum biasing spring 34, which is placed under tension when pendulum 16 swings downward, returns the pendulum to contact stop 43. Spring steel pawl 26 ratchets as the arm returns to the position shown without rotation of ratchet wheel 17.

The above described mode of operation is utilized for measuring the distance during walking and the kinetic energy stored in pendulum 16 during normal walking is insufficient to damage any of the elements of the device. However, if the user should run in this mode of operation, the amount of kinetic energy stored in each swing of the pendulum greatly increases with the attendant danger of damage. This problem is particularly severe when, as is highly desirable, the various elements such as the gears, ratchet wheel, case, bosses and the like are formed from plastic. To prevent such damage, auxiliary spring 32 is provided. Referring to FIG. 1 and FIG. 2, it may be seen that auxiliary spring 32 is formed in a generally U-shape having one leg of the U attached to shaft 31 and the opposite leg bent in a slight arcuate shape best seen in FIG. 2. Shaft 31 is coupled to selector knob 30 which may be rotated as indicated by arrow F with index 33 indicating a WALK or RUN mode. As shown in FIG. 3, stops 56, 57 are provided to limit the rotation of knob 30 to 90°. Stops 56 and 57 contact post 58 in the WALK and RUN positions respectively. In FIGS. 1 and 2, knob 30 is shown in the extreme clockwise direction which is utilized for walking. Auxiliary spring 32 is clear of first bias spring 34 which contacts pendulum arm 16 to provide its restraining force. As may be noted, spring wire 34 terminates in a coil spring 36 mounted to boss 28. When it is desired to use the device for measuring the distance of a runner, knob 30 is rotated counterclockwise to the stop position as shown in FIG. 3. Referring to FIG. 2, in the walk position, spring 32 is in the position shown as 32a and in the run position, spring 32 is in the position shown by the dashed lines at 32b. It will be noted that the outside leg of U-spring 32b is in contact with bias spring wire 34. As pendulum 16 swings in response to the movement of the runner's body both first spring 34 and auxiliary spring 32 are placed under tension. The extra tension produced in auxiliary spring 32 results in dissipation of additional kinetic energy present in pendulum 16 thereby preventing possible damage to the various elements of the device.

As may be noted in FIG. 1, counter 12 includes a set of driving gears 51 which is pivoted. The gear set 51 is normally engaged with the indicator gears 54; however to rest the counters, a reset lever 53 operated by reset button 52 is provided. Operation of button 52 raises gear set 51 clear of driving gears 54 which, by virtue of spring loading means, return to a zero setting.

FIG. 4 illustrates a typical arrangement of case 10 having an opening 55 for reading of counter 12 and a belt or clothing clip 50. As may be seen, stride adjustment knob 44 is marked for the lengths of strides to be used. As previously mentioned, the entire pedometer may be constructed of plastic with the exception of springs 32, 34, 26, pendulum weight 35, and counter drive shafts. Advantageously, such construction permits the invention to be produced at low cost.

A lightweight, low cost pedometer instrument has been disclosed utilizing a dual mode pendulum to drive a digital counter. The pendulum travel is externally adjustable for a desired user stride and a control to select a walk mode or a run mode is provided. Although a particular mechanism has been disclosed, it will be obvious to those of skill in the art to make various modifications thereto without departing from the spirit and scope of the invention.

I claim:

1. A dual mode pedometer for indicating distance traveled by a user in walking or running comprising:
   a case;
   a mechanical counter disposed in said case;
   counter driving means coupled to said counter, said driving means including a pendulum, said driving means for advancing said counter proportional to a length of swing of said pendulum;
   first pendulum biasing means for maintaining said pendulum in an at-rest position and for restoring said pendulum to its at-rest position after movement thereof responsive to a walking stride of the user; and
   second pendulum biasing means for increasing the strength of said first biasing means for restoring said pendulum to its at-rest position after movement thereof responsive to a running stride of the user.

2. The pedometer as defined in claim 1 which further comprises:
   adjustable stop means for controlling the length of swing of said pendulum; and
   adjustment means external to said case for selectively adjusting said stop means for a desired stride of the user.

3. The pedometer as defined in claim 2 which further comprises counter reset means independent of said stride adjustment means.

4. The pedometer as defined in claim 1 which further comprises control means connected to said second pendulum biasing means for selectively engaging and disengaging said second pendulum biasing means from said first pendulum biasing means.

5. The pedometer as defined in claim 4 which further includes counter reset means, said reset means independent of said control means.

6. The pedometer as defined in claim 1 in which said mechanical counter displays the distance traveled in digital form.

7. The pedometer as defined in claim 1 in which said driving means includes:
   a gear train connected to drive and advance said counter;
   a ratchet wheel operatively connected to said gear train;
   a driving arm having a first sector gear and a driving pawl engaged with said ratchet wheel for rotating said ratchet wheel in one direction; and
   a second sector gear connected to said pendulum, whereby movement of said pendulum causes rotation of said driving arm thereby rotating said ratchet wheel in a direction to advance said counter.

8. The pedometer as defined in claim 1 in which:
   said first pendulum biasing means includes a coil spring anchored to said case and having an extending wire arm engaging said pendulum; and
   said second pendulum biasing means includes a wire spring adapted to contact said wire arm when said pendulum is in its at-rest position.

9. The pedometer as defined in claim 8 in which said second pendulum biasing means includes a rotatable knob for selectively moving said wire spring into and out of contact with said wire arm.

* * * * *